(12) United States Patent
Piszczek et al.

(10) Patent No.: US 8,095,763 B2
(45) Date of Patent: Jan. 10, 2012

(54) METHOD FOR REDUCING LATENCY IN A RAID MEMORY SYSTEM WHILE MAINTAINING DATA INTEGRITY

(75) Inventors: Michael Piszczek, Laurel, MD (US); John G. Manning, Ellicott City, MD (US); Cedric Fernandes, Columbia, MD (US); Lauren Belella, Smithsburg, MD (US)

(73) Assignee: Datadirect Networks, Inc., Chatsworth, CA (US)

( * ) Notice: Subject to any disclaimer, the term of this patent is extended or adjusted under 35 U.S.C. 154(b) by 521 days.

(21) Appl. No.: 11/907,843

(22) Filed: Oct. 18, 2007

(65) Prior Publication Data

US 2009/0106491 A1 Apr. 23, 2009

(51) Int. Cl.
*G06F 12/00* (2006.01)
(52) U.S. Cl. ........ 711/167; 711/114; 714/6.24; 714/748
(58) Field of Classification Search ................... 711/114
See application file for complete search history.

(56) References Cited

U.S. PATENT DOCUMENTS

| 5,522,031 | A | * | 5/1996 | Ellis et al. ........................ 714/6 |
| 7,127,668 | B2 | | 10/2006 | McBryde et al. |
| 7,366,852 | B2 | * | 4/2008 | Hung ............................ 711/154 |
| 2001/0008007 | A1 | * | 7/2001 | Halligan et al. ............... 711/114 |
| 2003/0163639 | A1 | * | 8/2003 | Baum et al. .................... 711/113 |

FOREIGN PATENT DOCUMENTS

GB 2432440 A * 5/2007

* cited by examiner

*Primary Examiner* — Matthew Bradley
*Assistant Examiner* — Kalpit Parikh
(74) *Attorney, Agent, or Firm* — Rosenberg, Klein & Lee

(57) ABSTRACT

A latency reduction method for read operations of an array of N disk storage devices (210) having n disk storage devices (210A-210H) for data storage and p of disk storage devices (210I, 210J) for storing parity data is provided. Utilizing the parity generation engine's (230) fault tolerance of for a loss of valid data from at least two of the N disk storage devices (210A-210J), the integrity of the data is determined when N−1 of the disk storage devices (210A-210J) have completed executing a read command. If the data is determined to be valid, the missing data of the $N^{th}$ disk storage device is reconstructed and the data transmitted to the requesting processor (10). By that arrangement the time necessary for the $N^{th}$ disk storage device to complete execution of the read command is saved, thereby improving the performance of memory system (200).

20 Claims, 2 Drawing Sheets

METHOD FOR REDUCING LATENCY IN A RAID MEMORY SYSTEM WHILE MAINTAINING DATA INTEGRITY

BACKGROUND OF THE INVENTION

1. Field of the Invention

The present invention is directed to a method for reducing latency in read operations of a disk drive array while still insuring that valid data is provided therefrom. More particularly, the present invention is directed to a method of transferring data from less than all of the disk drives of the array to a stage buffer memory, checking the integrity thereof and reconstructing the data not transferred if the transferred data is valid. Still further, the present invention takes advantage of a dual parity generation engine's fault tolerance for a loss of valid data from at least any two of the plurality of disk drives, to transfer and integrity check data from N−1 of N disk storage channels to reduce latency of the memory array that would result if the memory array had to wait for a lagging $N^{th}$ disk drive to finish its individual read operation. The dual parity generation engine is able to identify invalid data present in the N−1 disk storage channels, and if the data is valid, reconstruct the data that was not transferred from the $N^{th}$ disk drive. The valid data reconstructed by the dual parity generation engine is transferred thereby to a stage buffer memory for subsequent transfer to a processor requesting the data to complete the read operation.

2. Prior Art

Computer systems often employ disk drive devices for storage and retrieval of large amounts of data. In order to increase capacity of the disk memory systems and provide some measure of reliability, the disk drive devices are formed in an array where the data is byte stripped across multiple disk drives, including parity data. To improve the reliability of the disk drive array, the storage system is arranged as a redundant array of disk drives. Redundant arrays of inexpensive disks (RAID), also referred to as redundant arrays of independent disks have grown in usage. In the originally proposed five levels of RAID systems, RAID-5 systems have gained great popularity for use in local area networks and independent personal computer systems, such as for media database systems. In RAID-5, data is interleaved by stripe units across the various disk drives of the array along with error correcting parity information. Unlike RAID-3, wherein data and parity information are stored in dedicated physical disk drives, RAID-5 distributes the data and parity information across all of the disk drives in an interleaved fashion, the data and parity information being stored in logical disk drives. The parity data in a RAID-5 system provides the ability to correct only for a failure of valid data from a single disk drive of the array.

RAID-6 systems have since been developed for data storage systems requiring a greater fault tolerance. In RAID-6, data is interleaved in striped units distributed with parity information across all of the disk drives, as in the RAID-5 system. However, to overcome the disadvantage of RAID-5's inability to correct for faulty data being retrieved for more than one disk drive, the RAID-6 system utilizes a redundancy scheme that can recover from the receipt of invalid data from any two of the disk drives. Although this scheme also uses logical disk drives, an additional disk drive device is added to the array to account for the additional storage required for the second level of parity data required. The RAID-6 parity scheme typically utilizes either a two-dimensional XOR algorithm or a Reed-Solomon code in a P+Q redundancy scheme. Thus, utilizing a RAID-6 architecture, multiple disk data errors in a single redundancy group can be detected, and single disk data errors in the redundancy can be corrected.

In order to provide large data capacity, a large number of disk drives are often arrayed and the additional disk drives required for two or more levels of parity data further increases the total number of disk drives in the array. As these systems send the same command to all of the disk drives, and then wait for all of the disks to finish a command before a new command is sent thereto, the data transfer rate of the memory array is limited by the "slowest" disk drive of the array. That characteristic can be particularly limiting since disk drives often exhibit unduly long access times as they begin a failure process were their performance degrades, sometimes long before they are identified as having failed by the memory system or the drive itself.

Current RAID-3 systems tried to overcome this latency problem by starting data transfers early, before all of the disk drives have completed a read command, so long as the data needed is already in the cache memory or can be reconstructed utilizing parity data. However, RAID-3 systems employing such techniques are unable to verify the integrity of the data being transferred to the initiator when that latency reduction technique is utilized. This method of improving latency is at a cost of data integrity, which is not an acceptable trade-off. Thus, there is a need to provide a method for reducing latency while still preserving the data integrity of the data provided by the memory system.

SUMMARY OF THE INVENTION

The invention of the subject patent application is directed to a method of reducing latency in read operations from an array of N disk storage devices. N equals n data storage devices, where n is greater than one, plus p parity storage devices. The p parity storage devices provide a fault tolerance for a loss of valid data from at least two of the N disk storage devices. The method includes the steps of performing a read operation from the array of N disk storage devices to provide requested data, and identifying the read operation has completed on at least N−1 of the disk storage devices. The method further includes the step of determining integrity of data read from the N−1 disk storage devices. Still further, the method includes transferring the requested data to the processor requesting that data if the data read from the N−1 disk storage devices is valid, and if the data read from the N−1 disk storage devices is invalid, the method requires waiting for all N disk storage devices to complete the read operation and repeat the integrity check thereof.

From another aspect, the method of the present invention is directed to a method of reducing latency in read operations from an array of disk storage devices arranged in N disk channels where N is a number greater than 3. The method includes the step of providing a central control system for queuing commands for said N disk channels. The method includes providing each disk channel with buffer storage and a disk control system for controlling operation of a corresponding disk storage device. The disk control system is operable to receive a multiplicity of queued commands from the central control system and reorder an execution of those commands to minimize a latency of the corresponding disk storage device. The method further includes the step of providing a parity engine coupled to the plurality of disk channels. The parity engine utilizes data from at least two of said N disk channels to provide a fault tolerance for a loss of valid data from at least any two of said N disk channels. The method also includes the steps of performing a read operation from the array of disk storage devices to provide requested data and identifying that the read operation has completed on at least N−1 of the disk channels. Still further, the method includes determining integrity of data read from said N−1 disk channels, and if that data is valid, transferring the requested data to the processor requesting said data. If, however, the data read from the N−1 disk channels is invalid, the method includes waiting for all N disk channels to complete said read operation and determining if the data from all N disk channels is valid.

From yet another aspect, the invention of the subject patent application is directed to a method of reducing latency in read operations from an array of disk storage devices arranged in N disk channels, where N is a number greater than 3. The method includes the steps of providing at least two of the N disk channels for storage of parity data, and performing a read operation from the array of disk storage devices to provide requested data. The method includes identifying the read operation has completed on at least N−1 of the disk channels. The method further includes the step of determining integrity of data read from the N−1 disk channels. If the data read from the N−1 disk channels is valid, the method includes transferring the requested data to the processor requesting that data. If the data read from the N−1 disk channels is invalid, the method includes waiting for all N disk channels to complete the read operation and determining if the data from all N disk channels is valid.

DESCRIPTION OF THE PREFERRED EMBODIMENT

Figure 1:
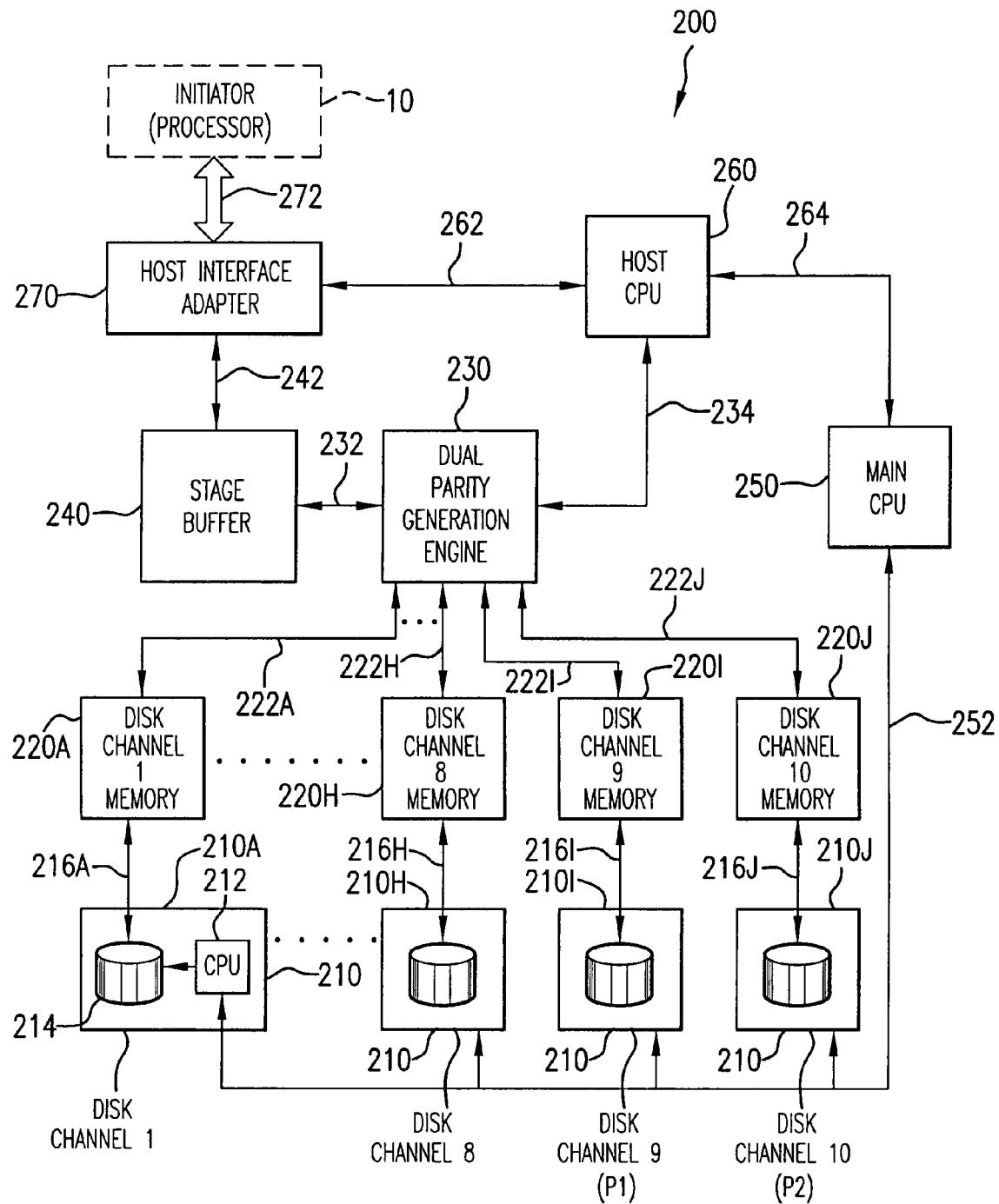
FIG. 1 is a simplified block diagram illustrating the architecture of the memory system of the present invention.

Referring now to FIG. 1, there is shown memory system 200 for storing and retrieving data for use by one or more processors 10. As will be seen in following paragraphs, memory system 200 provides for access of data with reduced latency while still providing valid data to a requesting processor 10, hereinafter referred to as an initiator. Although not restricted to any particular redundant array of independent disks (RAID), the method of reducing latency while still maintaining the integrity of the data stored in memory system 200 is illustrated herein in conjunction with a RAID memory system having at least a two disk storage device failure fault tolerance. To have the capability to reduce latency in memory system 200 and maintain the integrity of the data retrieved from memory system 200 in a manner that is transparent to the initiator, requires a memory architecture which is able to tolerate a loss of valid data from at least any two of the plurality of disk storage devices 210 of memory system 200. Memory system 200 utilizes several different methods to reduce the latency in the operations thereof. Latency, as used herein, refers to the overall time to complete a command, and not simply the rotational latency of the disk storage devices of system 200. Thus, the reduction in latency over prior art arrays of disk storage devices provided by memory system 200 is a measure of the high performance of data transfer provided thereby.

Memory system 200 includes an array of N disk storage devices 210 for storing data and parity values corresponding to the data stored in the array. The array includes n data disk storage channels, which in the example illustrated herein is formed by eight disk drives 210A-210H. However, in a RAID architecture two (2) data disk storage devices is usual considered to be a minimum number of data disk storage devices and likewise a minimum number of data disk storage channels. The array of disk storage devices 210 includes p parity disk storage channels, which in the example illustrated herein is formed by two parity disk drives 210I and 210J, for storing check data corresponding to the data stripes stored in the n data disk storage channels. Since a two disk drive failure fault tolerance is required to maintain data integrity in the latency reduction scheme of memory system 200, RAID systems require a minimum of two (2) parity disk storage devices and accordingly a like minimum number of parity disk storage channels. Thus, as a minimum, N for memory system 200 will equal four (4). Data disk storage channels may be formed by more disk drives, as illustrated in FIG. 1, the number being chosen based on such factors as the data capacity for memory system 200 and cost, while the number of parity storage channels may be increase to accommodate greater reliability requirements. For simplicity, each disk storage channel is illustrated as containing a single disk storage device 210. Although not important to the inventive method described herein, in high capacity memory systems each disk storage channel may include multiple disk storage devices, and those disk storage devices may be arranged in a plurality of tiers. Data and parity disk storage devices, as well as data and parity storage channels may be either physical or logical devices/channels, and this too is not important to the inventive concepts disclosed herein.

The RAID architecture most often used to provide a fault tolerance for a loss of valid data from two disk drives of the array is designated as RAID-6. In a conventional RAID-6 system, check data is stored in two logical parity drives of the system, in actuality, the parity data is distributed in an interleaved fashion with the striped data across all of the drives of the array and memory system may be a conventional RAID-6 system. In one working embodiment of memory system 200, a physical allocation of data and parity drives is used, in a manner similar to that of a RAID-3 system, but with two parity drives instead of one. For this architecture, the data is striped across the plurality of data disk storage channels 1-8, and drives 9 and 10 are reserved as dedicated parity drives for storing the parity information.

Utilizing the dual parity generation engine 230, memory system 200 provides two parity disk storage channels, channels 9 and 10, to provide two parity disk storage channels. Where disk storage channels 9 and 10 are physical parity disk storage channels, they are dedicated to parity data storage. Each of the disk storage devices 210 includes a control central processing unit (CPU) 212 for controlling the operation of the disk storage media 214, which are representatively shown for only the disk storage channel 210A (for clarity). Each of the disk storage channels 210A-210J is respectively coupled to a disk channel memory 220A-220J through a corresponding data bus 216A-216J. Each of the disk channel memories 220A-220J acts as a data cache for data being read from and written to the corresponding disk storage devices 210. The disk channel memories 220A-220J may be separate and distinct dual port memories, or a single dual port memory which is divided into a plurality of subunits corresponding to the data strips for each of the disk storage channels.

The data read into the plurality of disk channel memories 220A-220J is read by a dual parity generation engine 230, processed to determine the validity of the data, and the data transferred to a stage buffer 240. The data read from the plurality of disk channel memories 220A-220J is transferred to the dual parity generation engine 230 by means of a corresponding data bus 222A-222J. The data transferred on each data bus 222A-222J includes the corresponding data read from the disk storage channels 210A-210J, plus additional parity bits added to enable detection of transmission errors between the disk channel memories 220A-220J and the dual parity generation engine 230.

The dual parity generation engine 230 may be a processor which implements a dual parity RAID algorithm utilizing software. The RAID algorithm is one of a conventional RAID-6 type process such as a two-dimensional XOR algorithm or a Reed-Solomon P+Q algorithm having the ability to detect a loss of valid data from two of the plurality of disk storage channels 210A-210J. The dual parity generation engine can also be provided as a hardware implementation of the particular dual parity RAID algorithm being utilized. Although the particular implementation of the dual parity generation engine and the dual parity RAID algorithm are not important to the inventive concepts, as described herein, a field programmable gate array implementing a two-dimensional XOR algorithm has been successfully utilized to implement the dual parity generation engine in one working embodiment of the present invention.

The dual parity generation engine 230 transfers the data to the stage buffer 240 through a data bus 232 controlled and monitored by a host CPU 260 through a bus 234. Stage buffer 240 is a dual port memory which provides validated data to a host interface adaptor 270 through a direct memory access (DMA) bus 242. Host interface adaptor 270, under control of host CPU 260, through the host interface control bus 262, provides the data read from the stage buffer 240 to an initiator 210 through an interface bus 272. Host interface adaptor 270 provides the bus conversion between the DMA bus 242 and the interface bus 272. Interface bus 272 may be a peripheral component interconnect (PCI) bus, a peripheral component interconnect extended (PCI-X) bus, a peripheral component interconnect express (PCIe) bus, hyper transport (HTX) bus, or any other internal high speed communication bus appropriate for interfacing memory system 200 with one or more initiators 10. Where memory system 200 is an external peripheral to a computer system or network, interface bus 272 may be a distributed bus such as Ethernet or fiber channel, or other high speed distributed bus architecture.

Main CPU 250 monitors and controls the operation of the plurality of disk storage channels 210A-210J through disk control bus 252. As representatively shown with respect to disk storage channel 210A, main CPU 250 communicates with a CPU 212 of each respective disk storage device 210, in order to provide commands for the read and write operations of the respective disk storage devices and monitor the status thereof. Main CPU 250 communicates with the host CPU 260 through the CPU control and communications bus 264, signaling the host CPU when the read or write operations of the disk storage channels has been completed. Host CPU 260 controls the dual parity generation engine 230 through the bus 234 to test and transfer data from the plurality of disk channel memories 220A-220J to the stage buffer 240. After a transfer of valid data has been completed, CPU 260 will instruct the host interface adaptor 270 to transfer the data from the stage buffer 240 to the initiator 10.

Host interface adapter 270 may interface with multiple initiators 10, each requiring various read and write operations to be sequentially carried out. Main CPU 250 manages a queue of a sequence of commands for each disk storage device 210 and transmits multiple commands to CPU 212 of each respective disk storage device 210. Responsive to status communications from each CPU 212, main CPU 250 is able to keep track of the disk commands that are outstanding for each disk storage device 210. As one means of reducing latency, each CPU 212 is programmed to analyze the sequence of commands received from main CPU 250 and reorder that sequence to provide the best performance and the lowest overall latency. For instance, each CPU 212, at any time, chooses a command to execute from the plurality of commands from the queue based on the angular position of the disk media, selecting the command that requires the least amount of media rotation to place the required portion of the disk media under the drive's heads to execute the read or write command. Thus, each of the disk storage devices 210 independently executes commands, based on whatever sequence of commands can be executed with the least latency. Main CPU 250 Keeps track of the commands completed by each disk storage device 210 and notifies host CPU 260 when particular write commands have been completed and when the data read from the disk storage devices 210 is available in the disk channel memories 220A-220J for processing by dual parity generation engine 230. As will be described in following paragraphs, main CPU 250 is able to further reduce the latency of memory system 200 by not waiting for all of the disk storage devices 210 to finish a read operation before informing the host CPU 260 that the data is ready for processing by dual parity generation engine 230.

Main CPU 250 need not report to host CPU 260 that data is ready for processing by dual parity generation engine 230 before all of the disk storage devices 210 have completed a particular read command if the last disk storage device (the $N^{th}$ disk storage device) completes the read operation within a set time period. By waiting for all N disk storage devices 210 to finish a particular read operation before dual parity generation engine 230 processes the data read, memory system 210 is able to take full advantage of the dual parity generation engine's ability to detect a loss of valid data from two of the plurality of disk storage channels. However, when the $N^{th}$ disk storage device takes an unduly long time to provide data to the corresponding disk channel memory, main CPU 250 will signal host CPU 260 to begin the integrity check with the data supplied by N-1 disk storage devices. Thus the amount of time that the $N^{th}$ disk storage device lags behind the $N^{th}-1$ disk storage device to finish the particular read command is saved. That savings in time can be significant. It has been observed that often before disk drives are considered to have reached a "failed" status, they exhibit longer access times than other disk drives in the array executing the same command. A disk drive in that condition will affect the latency of the memory array over thousands of memory read/write operations before its operation degrades to the point that it is designated as having "failed." The ability to provide valid data to the initiator 10 without having to wait for a disk storage device that takes unduly long to complete a read command provides a significant improvement in performance of memory system 200.

The data not supplied from the $N^{th}$ disk storage device is of course identified to dual parity generation engine 230 as invalid data by host CPU 260, based on the status information it receives from main CPU 250. Since dual parity generation engine 230 can tolerate a loss of valid data from two of the plurality of disk storage channels, and can reconstruct valid data if invalid data is detected from one known disk channel, dual parity generation engine 230 can reconstruct the data from the $N^{th}$ disk storage channel if the data from the N-1 disk storage channels is good, and can detect when it is not. Thus, latency is able to be reduced without sacrificing the integrity of the data supplied to the initiator 10.

If the transfer status returned by the dual parity generation engine 230 to the host CPU 260 indicates the data is invalid, host CPU 260 will begin the error recovery procedure. The first step in error recovery is to wait for the N$^{th}$ disk storage device to complete the particular read operation. With data from all of the disk storage devices, the data transfer from the disk channel memories 220A-220J to the stage buffer 240 is repeated through dual parity generation engine 230, to recheck the integrity of the data and possibly reconstruct invalid data provided from one of the N−1 disk storage channels. If the data is still determined to be invalid, the transfer from the plurality of disk channel memories 220A-220J through the dual parity generation engine 230 to the stage buffer 240 will then be repeated. This retry of the transfer repairs most soft data errors and soft bus parity errors. If the retry does not produce valid data, the host processor 260 will initiate auto-correction technique, such as that disclosed in co-pending patent application Ser. No. 11/844,664, entitled Method For Auto-Correction Of Errors In A Raid Memory System, filed 24 Aug. 2007, or simply repeating the execution of the entire read command and validation of the data.

Figure 2:
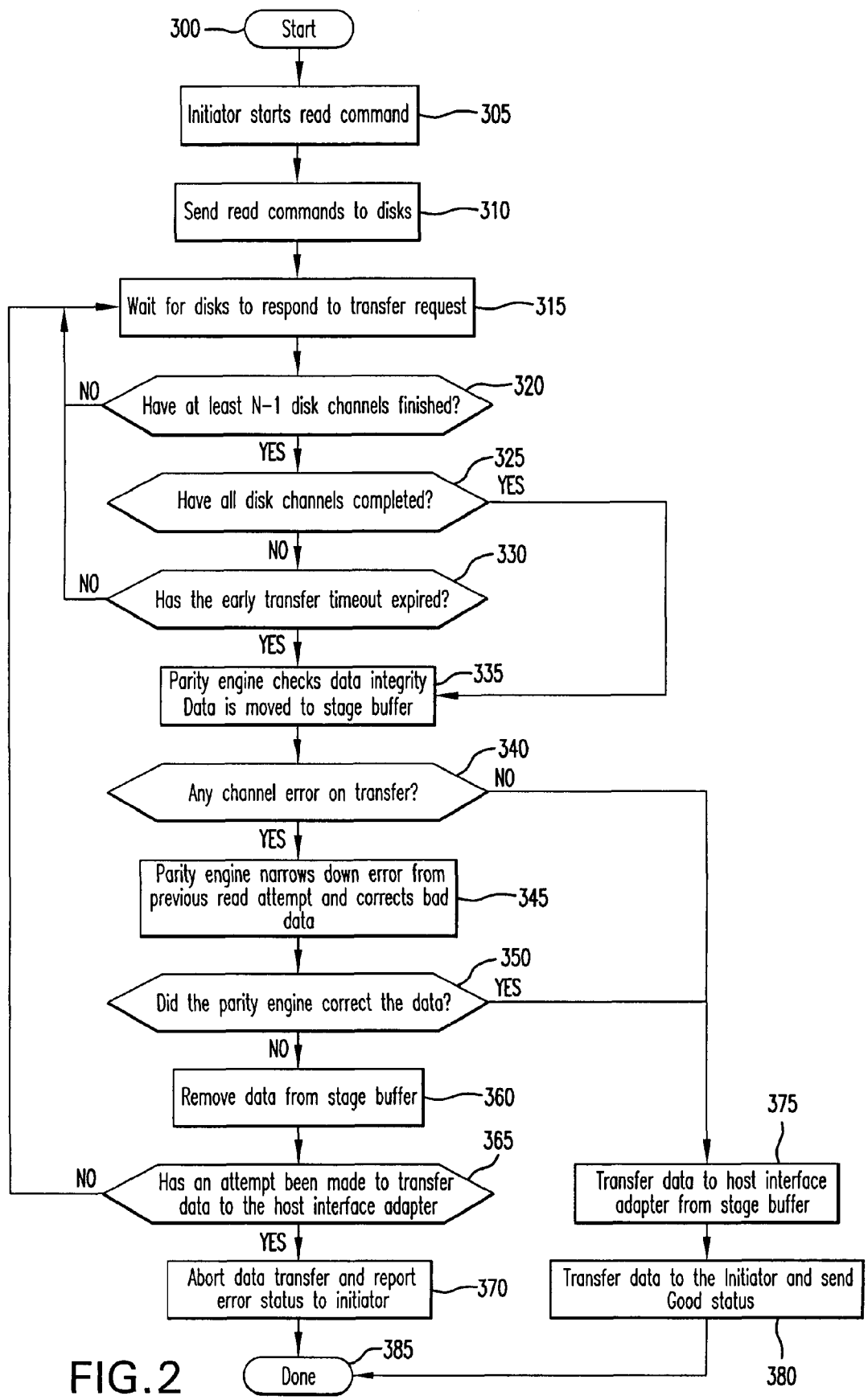
FIG. 2 represents a flow diagram of the method for reducing latency and still preserving data integrity in the present invention.

Referring now to FIG. 2, there is shown a flow chart illustrating a read operation of memory system 200 utilizing the latency reduction method of the present invention, wherein latency is reduced while maintaining the integrity of the data retrieved from memory system 200. The method flow starts from block 300 and flows to block 305 wherein a read command is sent by an initiating processor 10 to memory system 200. The flow then moves to block 310 wherein the read command is sent to the plurality of disk storage devices 210A-210J. From block 310, the flow then moves to block 315, wherein the main CPU 250 waits and monitors the status of the disk storage devices 210, in order to respond to the request to transfer data from the disk storage devices 210 to the initiator 10. The flow then moves from block 315 to decision block 320, wherein it is determined whether at least N−1 of the disk channels (9 disk channels in the example illustrated in FIG. 1) have finished executing the read command. If the at least N−1 of the disk channels have not completed execution of the read command, the flow passes back to block 315 and the process continues in a loop until N−1 of the disk channels have completed execution of the read command. When at least N−1 disk channels have completed execution of the read command, the flow passes to decision block 325. In block 325 it is determined whether all N of the disk channels have completed execution of the read command. If N−1 of the disk channels have completed execution of read command, rather than all N disk channels, the flow passes to decision block 330, wherein it is determined whether the time taken for N−1 of the disk channels to execute the command has exceeded a predetermined time limit. If the time limit has not been exceeded, then there is sufficient time to wait for the N$^{th}$ disk channel to provide its data and thereby maximize the fault tolerance provided by the dual parity generation engine 230. Thus, if the time has not expired, the flow passes from decision block 330 back to block 315, wherein main CPU 250 waits for the N$^{th}$ disk channel to complete execution of the read command. The time limit is selected as a function of the size and/or type of disk storage devices being used in memory system 200. In one working embodiment a time limit is selected within a range of 0 to 25 seconds, wherein a zero value is selected if there is to be no timeout and integrity is to be checked when ever N−1 disk channels have completed execution of read command. If the timeout period has expired, then the flow passes to block 335, wherein the integrity of the data from the N−1 disk channel is checked and data transferred to the stage buffer 240.

If when the flow passes to decision block 325, all N of the disk channels have completed the execution of the read command, the flow will then pass to block 335. In block 335 the parity engine checks the integrity of the data and transfers the data output from the dual parity engine 230 to the stage buffer 240.

The flow passes to decision block 340 from block 335, wherein the status from dual parity engine 230 is checked to determine whether any parity error occurred in any of the disk channels on the transfer to the stage buffer. If no error has occurred on the transfer, the flow passes to block 375 wherein the data is transferred from the stage buffer to the host interface adaptor 270. From block 375, the flow passes to block 380 wherein the data is transferred from the host interface adaptor 270 to the initiator along with a status indication that the data is good. From block 380, the flow then exits the routine at 385.

If in decision block 340 a channel error is detected on the transfer, the flow passes to block 345. In block 345 the parity engine narrows down the error utilizing information from the previous read attempts, and corrects the invalid data, as described in the above-referenced patent application Ser. No. 11/844,664 and incorporated by reference as if presented herein. Briefly, the correction process involves testing the data to identify the disk storage channel in error, including sequentially excluding data read from a different one of the plurality of disk channel memories 220A-220J from a parity check and determining the validity of data from remaining disk channel memories. If valid data is obtained, the disk storage channel from which the data was excluded is identified as the disk storage channel in error. With the disk storage channel in error identification having been made, the dual parity configuration of memory system 200 permits the data from that identified disk storage channel to be reconstructed. From block 345, the flow passes to decision block 350, wherein the parity engine status is checked to determine whether the data was able to be corrected. If the data was corrected, then the flow passes sequentially to blocks 375, 380 and 385 to transfer the to the initiator 10, as previously described.

If the data could not be corrected, as when there are data errors in multiple disk storage channels, the flow passes to block 360. In block 360, the data is removed from the stage buffer 240. From block 360, the flow passes to decision block 365, wherein it is determined whether an attempt to transfer data to the host interface adaptor 270 had been previously attempted. By attempt to transfer data to the host interface adaptor 270 it is meant that a transfer of data from the disk channel memories to the stage buffer through the dual parity engine had been made. If such a transfer had not been previously been made, and thus there had been no attempt to transfer data to the host interface adaptor, the flow passes back to block 315 where the main CPU 250 then waits for the N$^{th}$ disk channel to complete execution of the read command. If a previous attempt to transfer data to the host interface adaptor had been made, however, the flow then passes from decision block 365 to block 370. In block 370 the data transfer is aborted and host CPU 260 reports to the initiator 10, through host interface adapter 270, an error status for the read command, allowing the initiator 10 to determine whether the read command should be repeated. From block 370, the flow then exits the routine at block 385.

Therefore, it can be seen that memory system 200 provides a method of reducing latency while still maintaining data integrity in read operations from an array of N disk storage devices, where N equals n data storage devices, n being greater than 1, plus p parity storage devices, where the p parity storage devices provide a fault tolerance for a loss of valid data from at least two of the N disk storage devices. The read command is transferred from the main CPU 250 to each of the N disk storage devices, and main CPU 250 monitors the progress of the N disk storage devices, identifying when the read operation has been completed by at least N−1 of the disk storage devices. If an established time period has expired by the time N−1 of the disk storage devices has completed the read operation, the data from the N−1 disk storage devices is checked to determine its integrity. The use of the time period allows use of the data from all N disk storage channels when none of disk storage devices takes excessively long to perform a read operation, and thereby take full advantage of the capabilities of dual parity generation engine 230. However, this timeout feature may be eliminated in memory system 200 and the transfer process will then simply begin when N−1 of the disk storage devices 210 have completed execution of the particular read command. If the data read from the N−1 disk storage devices is valid, the missing data is reconstructed and the data requested by the initiator processor is transferred thereto. If, however, the data read from the N−1 disk storage devices is invalid, main CPU 250 will then wait for the $N^{th}$ disk storage device to complete execution of the read command and then signal the host CPU 260 to initiate the dual parity generation engine 230 to determine the integrity of the data read from the N disk storage devices. The method step of performing the read operation includes a transfer of the data read from the media of each disk storage device to a disk channel memory 220A-220J. The integrity of the data transferred to the disk channel memories 220A-220J is carried out by the dual parity generation engine 230 which also carries out a transfer of the data from the disk channel memories 220A-220J to the stage buffer 240. In the event that the dual parity generation engine 230 determines that the transferred data is invalid, the data transferred to stage buffer 240 is removed therefrom. The fault tolerance provided by the dual parity generation engine 230 allows for the transfer of data from N−1 of the disk channels, and if that data is valid, provides for the regeneration of the missing data, the data from the $N^{th}$ disk storage device 210. Thus, by this method, the performance of memory system 200 is enhanced by a reduced latency during read operations, and the integrity of the data supplied to the initiator 10 is assured.

While the present invention has been particularly described with reference to FIGS. 1 and 2, a particular number of disks in the disk drive array, and a particular arrangement of processors to control operation of the memory system, it should be understood that the Drawing figures are for illustration only and should not be taken as limitations upon the invention. It is further contemplated that many changes and modifications may be made to the invention, by one of ordinary skill in the art, without departing from the spirit and scope of the invention as disclosed herein. In particular, equivalent elements may be substituted for those specifically shown and described, various method steps may be interchanged, and while the present invention has been described as advantageously implemented in various hardware and software components, it will be appreciated that some of those components implemented in hardware, may be implemented equally well in software, and conversely, some elements implemented in software may be implemented in hardware or firmware as well, all without departing from the spirit or scope of the invention as defined in the appended claims.

What is being claimed is:

1. A method of reducing latency in read operations from an array of N disk storage channels, where N equals n data storage channels and n is greater than one, plus p parity storage channels and the p parity storage channels provide a fault tolerance for a loss of valid data from at least two of said N disk storage channels, the method comprising the steps of:
   a. sending read commands to said array of N disk storage channels, each read command being sent to all of the N disk storage channels simultaneously;
   b. performing a read operation for each read command from all of said array of N disk storage channels to provide requested data;
   c. identifying said read operation has completed on N−1 of said disk storage channels;
   d. determining integrity of data read from said N−1 disk storage channels;
   e. if said data read from said N−1 disk storage channels is valid, reconstructing data of a disk storage channel not having completed said read operation, and transferring said requested data to a processor requesting said requested data, and if said data read from said N−1 disk storage channels is invalid, waiting for all of the disk storage channels to then complete said read operation and determining integrity of data read from all said N disk storage channels;
   f. reconstructing data of any one disk storage channel found to be invalid from said determination of integrity of said data read from all said N disk channels; and
   g. repeating said steps (a)-(f) responsive to data from more than one disk channel being found to be invalid to correct for soft data errors.

2. The method as recited in claim 1, wherein the step of performing a read operation for each read command includes the step of respectively transferring data read from said plurality of disk storage channels to corresponding disk channel memories.

3. The method as recited in claim 2, wherein the step of determining the integrity of data read from said N−1 disk storage channels includes the step of using a dual parity generation engine to perform a parity check of said data read from said N−1 disk storage channels.

4. The method as recited in claim 3, wherein the step of using a dual parity generation engine to perform a parity check includes the step of using said dual parity generation engine to transfer said data read from N−1 of said disk channel memories to a buffer memory while performing said parity check.

5. The method as recited in claim 4, wherein the step of determining the integrity of data includes the step of removing said data read from said N−1 storage channels from said buffer memory responsive to a determination that said data read from said N−1 storage channels is invalid.

6. The method as recited in claim 1, wherein the step of determining integrity of data includes the step of using said data read from said N−1 disk storage channels to regenerate said data from the disk storage channel not having completed said read operation responsive to determining said data read from said N−1 disk storage devices is valid, and the step of reconstructing data of a disk storage channel not having completed said read operation is followed by the step of determining integrity of said reconstructed data.

7. The method as recited in claim 1, wherein the step of determining the integrity of data includes the step of using a dual parity generation engine to perform a parity check of said data read from said N−1 disk storage channels.

8. A method of reducing latency in read operations from a plurality of disk storage devices arranged in N disk channels, where N is a number greater than 4, the method comprising the steps of:
   a. providing a central control system for queuing commands for said N disk channels;

b. providing each disk channel with a buffer storage and a disk control system for controlling operation of a corresponding disk storage device, said disk control system being operable to receive a multiplicity of queued commands from said central control system and reorder an execution of said commands to minimize a latency of said corresponding disk storage device;

c. providing a parity engine coupled to said N disk channels, said parity engine utilizing data from at least two of said N disk channels to provide a fault tolerance for a loss of valid data from at least any two of said N disk channels;

d. sending read commands to said N disk channels, each read command being sent to all of the N disk channels simultaneously;

e. performing a read operation of each read command from all of said disk channels to provide requested data;

f. identifying said read operation has completed on N−1 of said disk channels;

g. determining integrity of data read from said N−1 disk channels;

h. if said data read from said N−1 disk channels is valid, reconstructing data of a disk channel not having completed said read operation and transferring said requested data to a processor requesting said requested data, and if said data read from said N−1 disk channels is invalid, waiting for all disk channels to complete said read operation and determining integrity of data read from all said N disk channels;

i. reconstructing data of any one disk storage channel found to be invalid from said determination of integrity of said data read from all said N disk channels; and j. repeating said steps (d)-(i) responsive to data from more than one disk channel being found to be invalid to correct for soft data errors.

9. The method as recited in claim 8, wherein the step of performing a read operation of each read command includes the step of respectively transferring data read from said corresponding disk storage device of each disk channel to the buffer storage of the disk channel.

10. The method as recited in claim 9, wherein the step of determining integrity of data includes the step of using said parity engine to transfer said data contained in said buffer storage of said N−1 disk channels to a stage buffer memory while performing a parity check of said data transferred from said buffer storage of said N−1 disk channels.

11. The method as recited in claim 10, wherein the step of determining the integrity of data includes the step of removing said data contained in said stage buffer memory therefrom responsive to a determination that said data is invalid.

12. The method as recited in claim 8, wherein the step of determining integrity of data includes the step of using said data read from said N−1 disk channels to regenerate said data from the disk channel not having completed said read operation responsive to determining said data read from said N−1 disk channels is valid, and the step of reconstructing data of a disk storage channel not having completed said read operation is followed by the step of determining integrity of the reconstructed data.

13. The method as recited in claim 8, wherein the step of providing a parity engine includes the step of providing a dual parity generation engine to perform a parity check of said data read from said N−1 disk channels.

14. A method of reducing latency in read operations from an array of disk storage devices arranged in N disk channels, where N is a number greater than 3, the method comprising the steps of:

a. providing at least two of said N disk channels for storage of parity data;

b. sending read commands to said N disk channels, each read command being sent to all of the N disk channels simultaneously;

c. performing a read operation for each read command from all of said N disk channels to provide requested data;

d. identifying said read operation has completed on N−1 of said disk channels;

e. determining integrity of data read from said N−1 disk channels;

f. if said data read from said N−1 disk channels is valid, reconstructing data of a disk channel not having completed said read operation and transferring said requested data to a processor requesting said requested data, and if said data read from said N−1 disk channels is invalid, waiting for all disk channels to complete said read operation, and determining if said data read from all said N disk channels is valid;

g. reconstructing data of any one disk storage channel found to be invalid from said determination of integrity of said data read from all said N disk channels; and h. repeating said steps (b)-(g) responsive to data from more than one disk channel being found to be invalid to correct for soft data errors.

15. The method as recited in claim 14, wherein the step of performing a read operation for each read command includes the step of respectively transferring data read from said N disk channels to corresponding disk channel memories.

16. The method as recited in claim 15, wherein the step of determining the integrity of data includes the step of using a dual parity generation engine to perform a parity check of said data read from said N−1 disk channels.

17. The method as recited in claim 16, wherein the step of using a dual parity generation engine to perform a parity check includes the step of using said dual parity generation engine to transfer said data read from said N−1 disk channels to a stage buffer memory and performing said parity check.

18. The method as recited in claim 17, wherein the step of determining the integrity of data includes the step of removing said data contained in said stage buffer memory therefrom responsive to a determination that said data read from said N−1 disk channels is invalid.

19. The method as recited in claim 14, wherein the step of determining integrity of data includes the step of using said data read from said N−1 disk channels to regenerate said data from the disk channel not having completed said read operation responsive to determining said data read from said N−1 disk channels is valid, and the step of reconstructing data of a disk storage channel not having completed said read operation is followed by the step of determining integrity of the reconstructed data.

20. The method as recited in claim 14, wherein the step of determining the integrity of data includes the step of using a dual parity generation engine to perform a parity check of said data read from said N−1 disk channels.

* * * * *